No. 654,417. Patented July 24, 1900.
J. M. SAILER.
FEEDER AND BAND CUTTER FOR THRESHING MACHINES.
(Application filed June 10, 1899.)
(No Model.) 2 Sheets—Sheet 2.

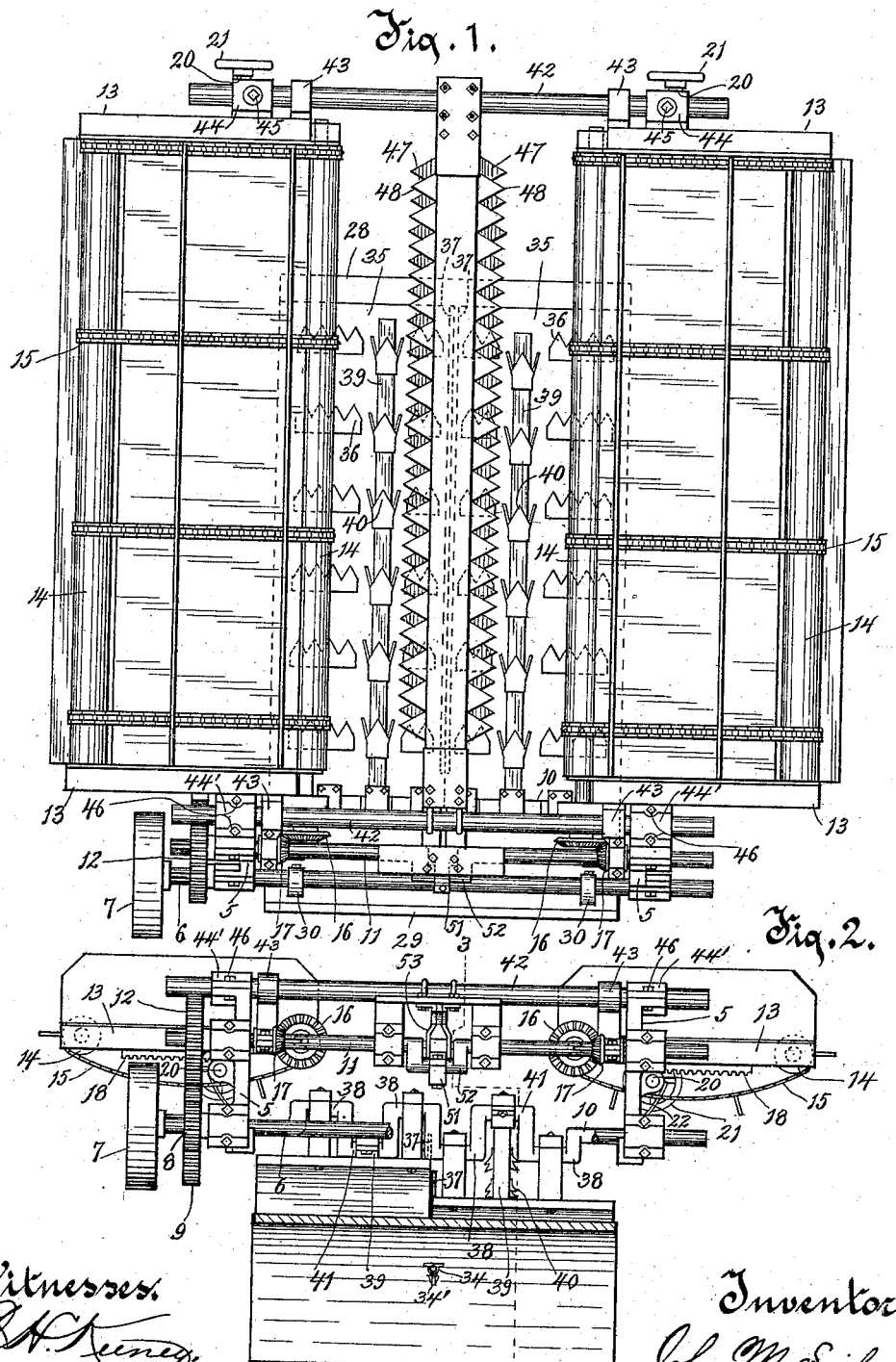

Witnesses.
C. N. Keeney.
Anna V. Faust.

Inventor.
John M. Sailer
By Benedict and Morsell
Attorneys.

UNITED STATES PATENT OFFICE.

JOHN M. SAILER, OF JANESVILLE, WISCONSIN.

FEEDER AND BAND-CUTTER FOR THRESHING-MACHINES.

SPECIFICATION forming part of Letters Patent No. 654,417, dated July 24, 1900.

Application filed June 10, 1899. Serial No. 720,019. (No model.)

*To all whom it may concern:*

Be it known that I, JOHN M. SAILER, of Janesville, in the county of Rock and State of Wisconsin, have invented a new and useful Improvement in Feeders and Band-Cutters for Threshing-Machines, of which the following is a description, reference being had to the accompanying drawings, which are a part of this specification.

My invention has relation to improvements in feeders and band-cutters for threshing-machines.

The invention has in view the provision of a machine which shall be simple and inexpensive in construction and which shall furthermore possess a high degree of durability in construction and positiveness in operation.

With the above primary and other incidental objects in view the invention consists of the devices and parts or their equivalents, as hereinafter more fully set forth.

Figure 3:
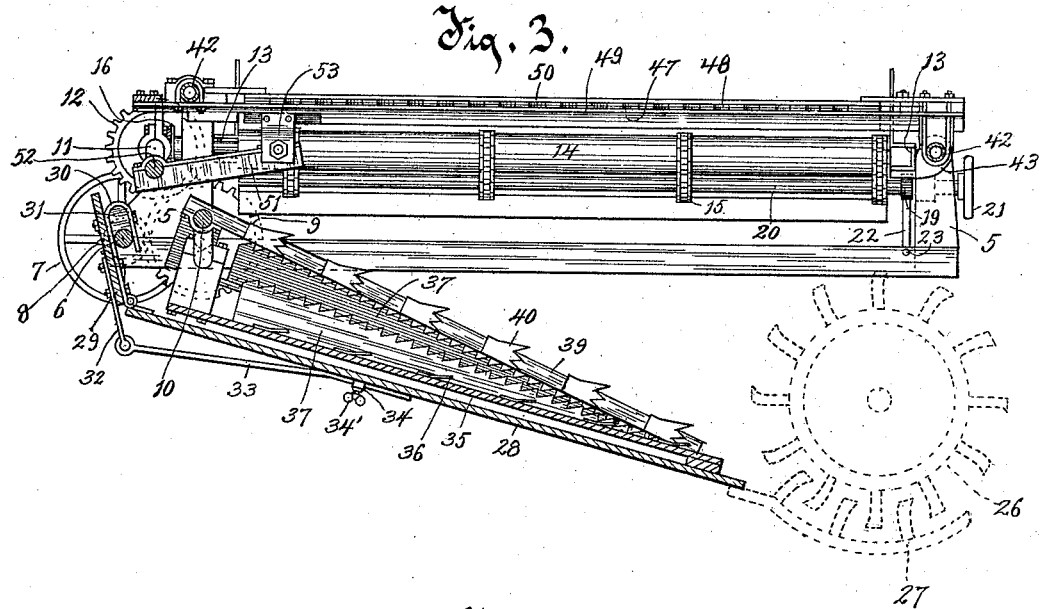
Figure 4:
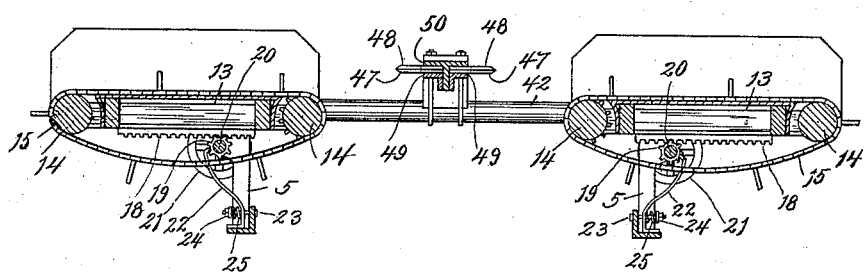

In the accompanying drawings, Figure 1 is a plan view of the invention. Fig. 2 is an elevation of one end, parts broken away and parts in section. Fig. 3 is a longitudinal vertical sectional view on the line 3 3 of Fig. 2, and Fig. 4 is a transverse section through the carrying mechanism and the cutting-knife.

Referring to the drawings, the numeral 5 indicates a frame which is adapted to be readily secured to and disconnected from any form of threshing-machine. Mounted in suitable bearings extending from one end of this frame is a main shaft 6, said shaft having on one end a belt-pulley 7, around which is adapted to be passed a belt, (not shown,) which is extended to and passed around a pulley carried by the actuating mechanism of the threshing-machine. Mounted upon shaft 6 is a pinion 8, which pinion meshes with a gear-wheel 9, carried on a shaft 10, also mounted in suitable bearings extending from the end of the frame. This shaft 10 is provided with a series of cranks, which will be hereinafter more fully referred to.

Above the shafts 6 and 10 and mounted in suitable bearings is another shaft 11, which shaft carries a gear-wheel 12, which is in mesh with the gear-wheel 9. It is obvious that from this arrangement when the main shaft 6 is rotated its rotation will be imparted to the crank-shaft 10 through the intermeshing of the pinion 8 and the gear-wheel 9 and rotation also imparted to the shaft 11 through the intermeshing of the gear-wheels 9 and 12.

The numerals 13 13 indicate side frames, in which are mounted the carrying mechanisms, preferably consisting of rolls 14 14, mounted in opposite longitudinal edges of each frame, and endless chains 15 passing around said rolls. These endless chains are shown as connected by means of longitudinal bars, which bars project from the chains and also serve to carry the grain along toward the knives when the chains are in motion, the grain lying on platforms arranged below the chains, as clearly shown in Figs. 1 and 4. Any other desirable form of carrying mechanism, however, can be substituted without departing from the spirit and scope of my invention. The forward roll of each carrying mechanism has mounted thereon a beveled gear 16, which meshes with a beveled pinion 17, mounted on the shaft 11. The beveled pinions 17 are fitted to feathers on the shaft 11, so as to be capable of a sliding movement thereon. Each side frame 13 is also provided with a depending rack-bar 18. These rack-bars are adapted to be engaged by toothed wheels 19 19, said toothed wheels carried at the ends of longitudinal shafts 20 20, the opposite ends of said shafts provided with hand-wheels 21 21 for convenience in turning the same. These shafts are mounted in bearings on the under sides of the frames 13. Spring-pawls 22 22 are adapted to engage the teeth of the toothed wheels 19. Short rods 23 23 pass through these spring-pawls, and on the threaded ends of these rods are carried nuts 24 24. Encircling the rods between these nuts and the spring-pawls are coiled springs 25 25. By turning the nuts 24 the tension of the springs 25 may be regulated, and consequently the tension of the spring-pawls also thereby regulated.

The numeral 26 indicates the usual drum or cylinder of a threshing-machine and the numeral 27 the concave below the same. These parts are shown by dotted lines in Fig. 3. One end of the concave is provided with a straight extension, on which rests one end of a feed-board 28. The opposite edge of this feed-board has hinged thereto a front board 29, the hinged straps of said board being turned inwardly to form hooks 30, which hooks engage over and are secured to a bar 31, said bar resting on the shaft 6. Secured to the outer side of the hinged board 29 is a depending strap 32, said strap having pivoted to its lower end an arm 33, the pivotal point between said arm and strap being out of line with the hinged connection between the feed-board 28 and the front board 29. The pivoted arm is adapted to be adjustably locked to the under side of the feed-board by any desirable means. The particular means shown consists of a small lug 34, projecting from the under side of the feed-board, said lug provided with an opening through which the arm 33 is free to pass. The arm 33 is held in an adjusted position in said opening by means of a thumb-screw 34'.

Above the bottom feed-board is a sectional conveyer, which may consist of any desired number of sections, (preferably two,) as shown in the accompanying drawings. These conveyer-sections are indicated by the numeral 35, and each is provided with a series of upwardly projecting and inclined prongs 36. At the inner edges of the conveyer-sections are secured toothed or serrated plates 37 37, which extend upwardly from the conveyers. The conveyer-sections 35 are hung on oppositely-extending cranks 38 38 from the crank-shaft 10, two similar cranks and connections, as shown, being preferably employed for each conveyer-section. As said crank-shaft is rotated, therefore, opposite and alternate reciprocations are imparted to the conveyer-boards. As one board is thrust toward the cylinder, the prongs 36 thereof will force the grain toward said cylinder, while the other board is moving in a direction away from the cylinder, and when the first-referred-to board has completed its thrust toward the cylinder it will then be moved in the opposite direction, or away from the cylinder, and the other board will then be thrust toward the cylinder. It will therefore be seen that the grain is uninterruptedly fed toward the cylinder by the alternate movements of the boards. The teeth of the plates 37 37 also act on the grain in a similar manner to the prongs 36 and assist in forcing said grain toward the cylinder. The plates 37 perform the additional function of acting as guards to prevent the grain from passing into the space between the inner edges of the conveyer-boards 35, and thereby prevent said space from being clogged up with the grain, which would otherwise occur, and seriously interfere with if not prevent the movements of the conveyer-boards.

Arranged above the conveyer-boards 35 are arms 39 39, one being preferably provided for each conveyer-board, although any desired number may be employed. These arms are formed or provided with projecting fingers 40, and the outer ends of the arms are mounted, respectively, upon oppositely-extending cranks 41 41, which cranks as the crank-shaft is rotated are given an opposite reciprocating movement. It will be noticed that the cranks 41 respectively point in opposite directions to the cranks 38. The result of this is that when a conveyer-board 35 is moving in one direction the arm 39 relating thereto is moving in the opposite direction.

Parallel with opposite ends of the frames 13 are guide-rods 42 42. These rods pass through eyed projections 43 from the end frames. Each end frame 13 has also projecting from opposite sides thereof bearings 44 44', in which said rods 42 are mounted. The bearing-boxes 44 have set-bolts 45 passing through the upper portions thereof and engaging the rod 42, and the bearing-boxes 44' have upper removable sections which are secured or clamped to the lower sections and to the other rod 42 by means of bolts 46.

The cutting mechanisms are located in the space between the two carrying mechanisms or endless aprons. Cutting mechanism is provided for each carrying mechanism, and each cutting mechanism consists of a stationary toothed or serrated blade 47 and a movable toothed or serrated blade 48, the two blades together adapted to effect a shearing cut. I show in the accompanying drawings the preferred means for mounting or carrying these cutting mechanisms, said means consisting of two stationary longitudinally-extending angle-beams 49 49, carried by suitable supports mounted on the rods 42, and a movable T-beam 50, the said cutting mechanisms being thereby held at a plane above the plane of the carrying mechanisms. The stem of this T-beam extends between the angle-beams, and to opposite sides of this stem are connected the movable blades 48 of the respective cutting mechanisms. A longitudinally-reciprocating movement is imparted to the T-beam, and as the blades 48, as stated, are connected to said T-beam a like movement of course is necessarily imparted to said blades. This reciprocation of the T-beam is accomplished by means of a pitman 51, which is connected at one end to a crank 52 on the shaft 11, the other end of said pitman being connected to a downwardly-extending projection 53 from the T-beam. By arranging the cutting mechanisms above the plane of the carrying mechanisms the bundles of grain must necessarily be brought into contact with the cutting mechanisms and the cutting of the binding-cords thereby assured. If the cutting mechanisms were on a plane with the carrying mechanisms, the bundles of grain would simply pass over the cutting mechanisms without any action of said cutting mechanisms on the binding-cords.

In the operation of the invention the bundles of grain are first placed lengthwise on the endless aprons and are carried along by said aprons until they reach the space in which the cutting mechanisms are located. The knives then act upon the bands of the sheaves and sever said bands. The loose grain as soon as cut falls onto the conveying mechanism below and is by said conveying mechanism forced to the cylinder or drum in the manner hereinbefore pointed out.

It will be seen that in my invention the intermediate connecting-framework between the two tables is of such width as to render my device capable of fitting the projecting arms which usually form a part of the separator. When, however, my invention is attached to some threshing-machines, it may be found necessary to adjust the width of the frame-sections 5 in order to secure the proper width to fit the separator or in order to adapt the attachment to suit the length of the cylinder. To accomplish this adjustment, the set-bolts 45 of the bearings 44 are loosened and also the bolts 46 of the bearings 44'. The frame-sections can then be spread apart or brought closer together to the required width. After the required adjustment is obtained the set-bolts 45 and the bolts 46 are again tightened.

By the provision of the racks 18 and the pinions 19 the side carriers can be adjusted at any time to suit the different conditions of the grain and the amount to be fed to the cylinder. If the grain is dry and easily threshed, a wide space can be provided between the carriers and the cutting mechanism, so as to allow a large quantity of grain to pass through, whereas if the grain is wet and hard to thresh the space is narrowed. In order to accomplish this adjustment of the side carriers, the hand-wheels 21 are turned in a proper direction in accordance with whether it is desired to adjust the carriers closer together or farther apart, and as these hand-wheels are turned the toothed wheels 19 are caused to engage the racks 18 and the requisite movement of the carriers thereby obtained. The spring-pawls 22 hold the carriers to adjusted position. When the carriers are moved inwardly toward each other, the gear-wheels 16 and the pinions 17 are maintained in mesh, inasmuch as the pinions 17 are carried by bearings which are rigid with the bearings 43 for the shaft 42, said bearings 43 projecting outwardly from the carrier-frames and both sets of bearings being movable on their respective shafts.

From the foregoing description of the construction of my invention it will be seen that I provide a machine in which efficient results are obtained by a comparatively-simple mechanism for the purpose. The grain is freely carried by the carriers to the cutting mechanism, and after the severance of the bands the cut grain is free to pass to and be acted upon by the conveying mechanism and forced by said conveying mechanism to the cylinder.

In my invention also it is impossible for any grain to pass to the cylinder in a crossed position, even though placed in a crooked position on the carriers, and this by reason of the fact that the grain is fed from opposite sides, which will compel the two bundles of grain to meet, and thereby be caused to arrange themselves so as to properly pass to the cylinder.

In my improved construction if grain is pitched faster from one side than the other, so as to cause a greater amount to feed from one side, the surplus grain will pass over the cutting mechanism to the other side, where there is a decreased feed, and consequently the feed from opposite sides will be equalized. This is a valuable improvement over all other side feeders.

The arms 39 not only assist in feeding the grain to the cylinder, but, furthermore, act to shake up the grain and knock it sidewise or break it to pieces, and as these arms alternate in motion some portion of one is always going toward the cylinder, which is also true of the conveying-boards 35, thereby making a very positive feeding mechanism. A continuous positive feeding mechanism is necessary in order to overcome the contrary air-blast which is caused by the rotation of the cylinder 26.

Whenever it is desired to obtain access to the cylinder 26, all that is necessary to be done is to loosen thumb-screw 34' and remove the arm 33 from engagement with the lug 34. The feed-board can then be readily swung down on its hinge.

What I claim as my invention is—

1. In a feeder and band-cutter, the combination, of side carrying mechanism adapted to feed inwardly grain which is deposited thereon, cutting mechanism arranged a distance from the inner edge of the carrying mechanism, said cutting mechanism mounted on stationary supports, and means for adjusting the carrying mechanism closer to or farther away from the permanently-fixed cutting mechanism, whereby the width of the space between the opposed edges of the two mechanisms may be either increased or decreased.

2. In a feeder and band-cutter, the combination, of carrying mechanisms adapted to feed inwardly from opposite sides, cutting mechanism arranged in the space between the carrying mechanisms, said cutting mechanism mounted on suitable supports, and means for adjusting the carrying mechanisms closer to or farther away from the permanently-fixed cutting mechanism, whereby the width of the space between the opposed edges of the cutting and carrying mechanisms may be either increased or decreased.

3. In a feeder and band-cutter, the combination, of carrying mechanisms adapted to feed inwardly from opposite sides, racks carried by said carrying mechanisms, toothed wheels engaging the racks, means for rotating the toothed wheels, whereby the carrying mechanisms are adjusted closer together or farther apart, and cutting mechanisms located in the space between the carrying mechanisms.

4. In a feeder and band-cutter, the combination, of cutting mechanism, an end frame provided with projecting bearings, rolls mounted in said frame, an endless apron passing around the rolls, a beveled gear carried by one of the rolls, rods passing through the bearings of the end frame, a shaft having a beveled gear slidingly mounted thereon and engaging the bevel-gear of the roll, means for rotating said shaft, and means for adjusting the end frame laterally.

5. In a feeder and band-cutter, the combination, of carrying mechanisms, angle-beams extending parallel therewith and at a distance therefrom, stationary cutting-blades secured to said angle-beams, other blades in contact with the first-mentioned blades, a T-beam to which said other blades are connected, the stem of said T-beam passing between the angle-beams, and means for reciprocating the T-beam.

6. The combination, of a concave, a feed-board resting on the concave, a board hinged to the feed-board, means for suspending said hinged board, an arm pivotally connected to the hinged board, the pivot being out of line with the hinge of the board, and means for detachably locking the arm to the feed-board.

7. The combination, of a cylinder or drum, conveyers adapted for forcing the grain to the cylinder, means for reciprocating said conveyers in opposite directions, arms arranged respectively above the conveyers and provided with projecting fingers, and means for reciprocating said arms in opposite directions to each other and in opposite directions to the conveyers above which they are located.

8. The combination, of a cylinder or drum, a shaft provided with sets of cranks, the cranks of each set extending in opposite directions, conveyers for forcing the grain to the cylinder, said conveyers connected to opposite cranks of one of the sets of cranks, and arms arranged above the conveyers and provided with projecting fingers, said arms connected to the opposite cranks of the other set of cranks.

9. In a feeder and band-cutter, the combination, of a main shaft, means for driving the same, a shaft provided with sets of cranks, the cranks of each set extending in opposite directions, an upper shaft having a crank and also having a beveled pinion mounted thereon, a gearing between the several shafts, carrying mechanism, a bevel-gear for moving the carrying mechanism, said bevel-gear being in mesh with the beveled pinion, cutting mechanism consisting of a stationary and a movable blade, a connection between the movable blade and the crank of the upper shaft, a cylinder, conveyers for forcing the grain to the cylinder, said conveyers connected to opposite cranks of one of the sets of cranks, and arms arranged above the conveyers and provided with projecting fingers, said arms connected to opposite cranks of the other set of cranks.

In testimony whereof I affix my signature in presence of two witnesses.

JOHN M. SAILER.

Witnesses:
JOHN CUNNINGHAM,
MAE V. SULLIVAN.